US012793678B2

(12) United States Patent
Sato et al.

(10) Patent No.: US 12,793,678 B2
(45) Date of Patent: Nov. 10, 2026

(54) INFORMATION PROCESSING DEVICE, METHOD AND A COMPUTER-READABLE NON-TRANSITORY RECORDING MEDIUM

(71) Applicant: CASIO COMPUTER CO., LTD., Tokyo (JP)

(72) Inventors: Hiroki Sato, Nishitokyo (JP); Hajime Kawashima, Akishima (JP)

(73) Assignee: CASIO COMPUTER CO., LTD., Tokyo (JP)

(*) Notice: Subject to any disclaimer, the term of this patent is extended or adjusted under 35 U.S.C. 154(b) by 904 days.

(21) Appl. No.: 18/187,146

(22) Filed: Mar. 21, 2023

(65) Prior Publication Data

US 2023/0306938 A1 Sep. 28, 2023

(30) Foreign Application Priority Data

Mar. 23, 2022 (JP) ................................ 2022-046538

(51) Int. Cl.
*G10H 1/18* (2006.01)
*G10H 1/34* (2006.01)

(52) U.S. Cl.
CPC ................ *G10H 1/18* (2013.01); *G10H 1/34* (2013.01); *G10H 2210/221* (2013.01)

(58) Field of Classification Search
CPC ....... G10H 1/18; G10H 1/34; G10H 2210/221
See application file for complete search history.

(56) References Cited

U.S. PATENT DOCUMENTS 10,055,413 B2 8/2018 Jehan et al.
10,290,291 B2 5/2019 Tsuda et al.
10,726,821 B2 7/2020 Kanada et al.
2004/0168564 A1* 9/2004 Koseki .................... G10H 1/18 84/615
2021/0158790 A1 5/2021 Huang et al.

FOREIGN PATENT DOCUMENTS

CN 1525433 A * 9/2004 .............. G10H 1/18
JP 2004264501 A 9/2004
JP 3815583 B2 * 8/2006

OTHER PUBLICATIONS

Indian Office Action (and an English language translation thereof) dated Jul. 18, 2025, issued in Indian Application No. 202314018941.

* cited by examiner

*Primary Examiner* — Jianchun Qin
(74) *Attorney, Agent, or Firm* — Holtz, Holtz & Volek PC

(57) ABSTRACT

An information processing device includes at least one processor that executes a program stored in a memory. The processor executes processing of acquiring first information corresponding to a first musical sound and second information corresponding to a second musical sound generated after the first musical sound, acquiring a first occurrence probability, which is an occurrence probability of a special playing style with respect to an elapsed time since an end of a predetermined operation, and a second occurrence probability, which is an occurrence probability of the special playing style with respect to an elapsed time after the first musical sound is generated until the second musical sound is generated, according to the first and second information, and determining whether to generate the second musical sound with any one of a normal playing style and the special playing style, according to the first and second occurrence probability.

15 Claims, 15 Drawing Sheets

(CONT.)

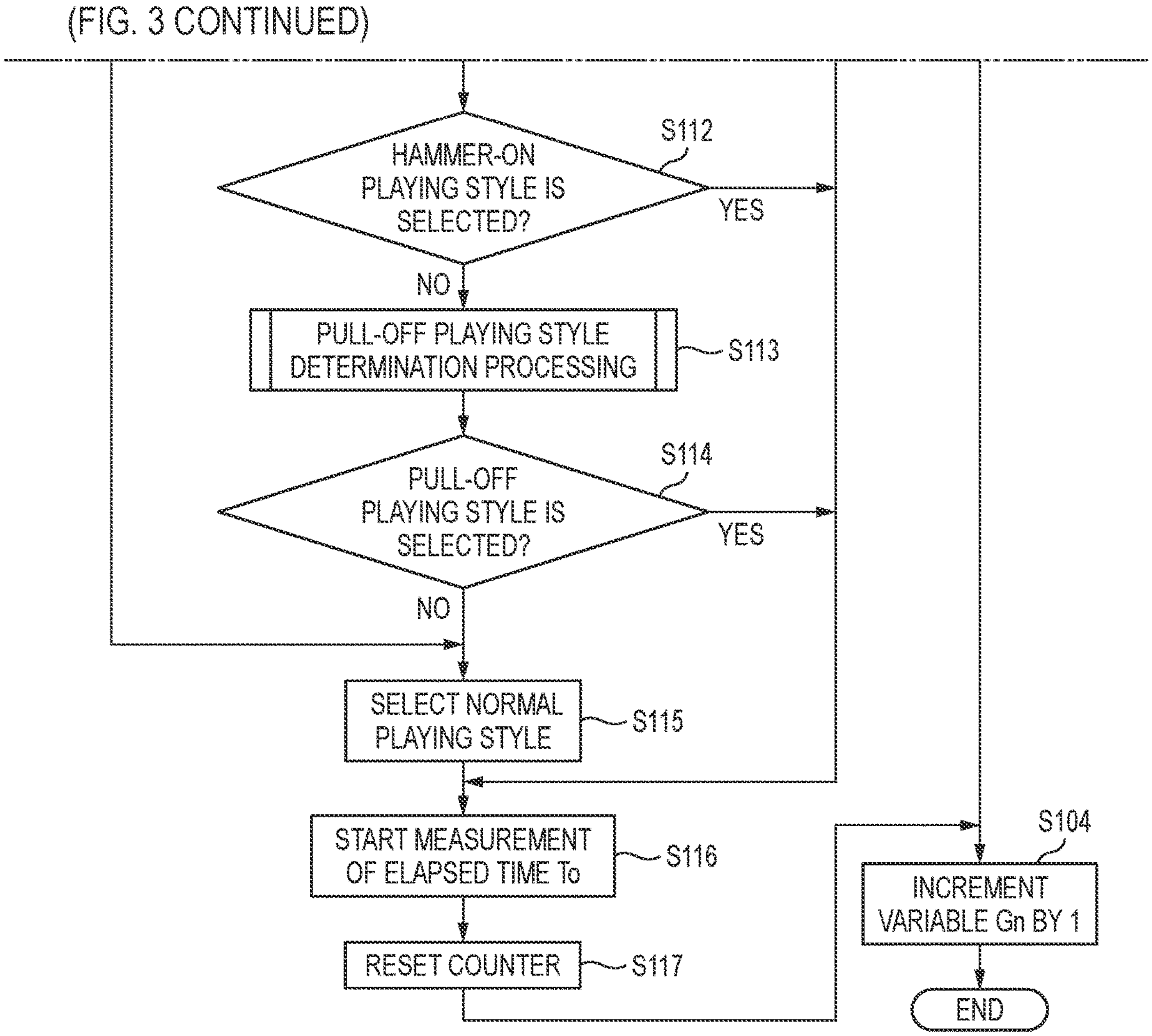
(FIG. 3 CONTINUED)
HAMMER-ON PLAYING STYLE IS SELECTED?
S112
YES
NO
PULL-OFF PLAYING STYLE DETERMINATION PROCESSING
S113
PULL-OFF PLAYING STYLE IS SELECTED?
S114
YES
NO
SELECT NORMAL PLAYING STYLE
S115
START MEASUREMENT OF ELAPSED TIME To
S116
RESET COUNTER
S117
S104
INCREMENT VARIABLE Gn BY 1
END

FIG. 8

| DIFFERENCE IN SOUND VOLUME (%) | OCCURRENCE PROBABILITY Pgv (%) |
|---|---|
| 10 OR GREATER | 0 |
| GREATER THAN 0 BUT LESS THAN 10 | 50 |
| -5 OR GREATER AND 0 OR LESS | 100 |
| -10 OR GREATER AND LESS THAN -5 | 80 |
| -20 OR GREATER AND LESS THAN -10 | 50 |
| LESS THAN -20 | 0 |

FIG. 9

| NUMBER OF MOVED FRETS | OCCURRENCE PROBABILITY Pgp (%) |
|---|---|
| +4 OR MORE | 0 |
| +3 | 30 |
| +2 | 60 |
| +1 | 100 |
| 0 | 0 |
| -1 | 100 |
| -2 | 60 |
| -3 | 30 |
| -4 OR LESS | 0 |

FIG. 11

| NUMBER OF CONSECUTIVE SOUND GENERATIONS | OCCURRENCE PROBABILITY Poc (%) |
|---|---|
| 3 or more | 0 |
| 2 | 50 |
| 1 | 75 |
| 0 | 100 |

FIG. 12

| DIFFERENCE IN SOUND VOLUME (%) | OCCURRENCE PROBABILITY Pov (%) |
|---|---|
| 50 OR MORE | 0 |
| 10 OR GREATER AND LESS THAN 50 | 50 |
| GREATER THAN 0 BUT LESS THAN 10 | 75 |
| -5 OR GREATER AND 0 OR LESS | 100 |
| -10 OR GREATER AND LESS THAN -5 | 75 |
| -20 OR GREATER AND LESS THAN -10 | 50 |
| LESS THAN -20 | 25 |

FIG. 13

| NUMBER OF MOVED FRETS | OCCURRENCE PROBABILITY Pop (%) |
|---|---|
| +6 OR MORE | 0 |
| +5 | 10 |
| +4 | 25 |
| +3 | 50 |
| +2 | 100 |
| +1 | 100 |
| 0 OR LESS | 0 |

FIG. 15

| NUMBER OF CONSECUTIVE SOUND GENERATIONS | OCCURRENCE PROBABILITY Pfc (%) |
|---|---|
| 3 OR MORE | 0 |
| 2 | 30 |
| 1 | 50 |
| 0 | 100 |

FIG. 16

| DIFFERENCE IN SOUND VOLUME (%) | OCCURRENCE PROBABILITY Pfv (%) |
|---|---|
| 50 OR MORE | 0 |
| 10 OR GREATER AND LESS THAN 50 | 50 |
| GREATER THAN 0 BUT LESS THAN 10 | 75 |
| -5 OR GREATER AND 0 OR LESS | 100 |
| -10 OR GREATER AND LESS THAN -5 | 75 |
| -20 OR GREATER AND LESS THAN -10 | 50 |
| LESS THAN -20 | 25 |

FIG. 17

| NUMBER OF MOVED FRETS | OCCURRENCE PROBABILITY Pfp (%) |
|---|---|
| 0 OR MORE | 0 |
| -1 | 100 |
| -2 | 100 |
| -3 | 75 |
| -4 | 40 |
| -5 | 10 |
| -6 OR LESS (IN OTHER WORDS, 6 FRETS OR MORE IN THE MINUS DIRECTION) | 0 |

INFORMATION PROCESSING DEVICE, METHOD AND A COMPUTER-READABLE NON-TRANSITORY RECORDING MEDIUM

CROSS-REFERENCE TO RELATED APPLICATIONS

This application claims priority to and the benefit of Japanese Patent Application No. 2022-046538 filed on Mar. 23, 2022, the entire contents of which are incorporated herein by reference.

TECHNICAL FIELD

The disclosure of the present specification relates to an information processing device, a method and a computer-readable non-transitory recording medium.

BACKGROUND ART

Known is a technology for reproducing musical sounds of plucked string instruments in electronic keyboard musical instruments. For example, JP2004-264501A describes an electronic keyboard musical instrument capable of generating musical sounds with a special playing style such as a glissando playing style and a hammer-on playing style.

In the electronic keyboard musical instrument described in JP2004-264501A, a function for allowing a player to select a playing style is assigned to some keys (keys in the non-sound-generating key area) in the keyboard. The player can select a playing style at a time of generating a musical sound by operating a key in the non-sound-generating key area.

SUMMARY

An information processing device according to an embodiment of the present disclosure includes a control unit configured to executing processing of acquiring first information about a first musical sound, acquiring second information about a second musical sound played or generated after the first musical sound, acquiring a probability based on the acquired first information and second information, and selecting a playing style at a time of generating the second musical sound from a plurality of types of playing styles, according to the probability.

BRIEF DESCRIPTION OF THE DRAWINGS

FIG. 8 shows a table that is referred to when calculating a probability that a musical sound will be generated with a glissando playing style in an embodiment of the present disclosure.

FIG. 9 shows a table that is referred to when calculating a probability that a musical sound will be generated with a glissando playing style in an embodiment of the present disclosure.

FIG. 11 shows a table that is referred to when calculating a probability that a musical sound will be generated with a hammer-on playing style in an embodiment of the present disclosure.

FIG. 12 shows a table that is referred to when calculating the probability that a musical sound will be generated with the hammer-on playing style in an embodiment of the present disclosure.

FIG. 13 shows a table that is referred to when calculating the probability that a musical sound will be generated with the hammer-on playing style in an embodiment of the present disclosure.

FIG. 15 shows a table that is referred to when calculating a probability that a musical sound will be generated with a pull-off playing style in an embodiment of the present disclosure.

FIG. 16 shows a table that is referred to when calculating the probability that a musical sound will be generated with the pull-off playing style in an embodiment of the present disclosure.

FIG. 17 shows a table that is referred to when calculating the probability that a musical sound will be generated with the pull-off playing style in an embodiment of the present disclosure.

DESCRIPTION OF EMBODIMENTS

Figure 1:
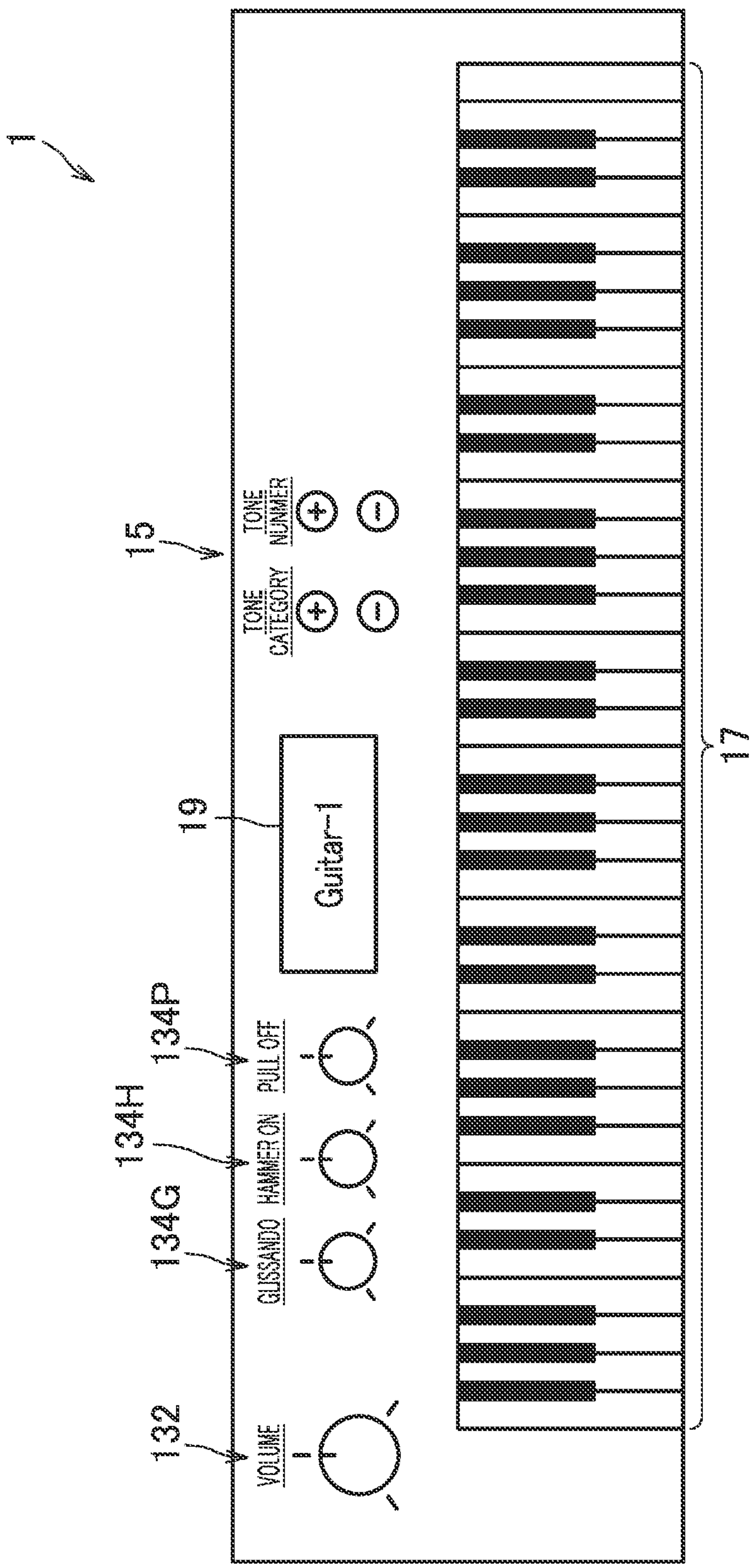
FIG. 1 shows an appearance of an electronic musical instrument according to an embodiment of the present disclosure.

Referring to the drawings, an information processing device according to an embodiment of the present disclosure, a method that are executed by the information processing device, which is an example of a computer, and a computer-readable non-transitory recording medium will be described in detail.

Figure 2:
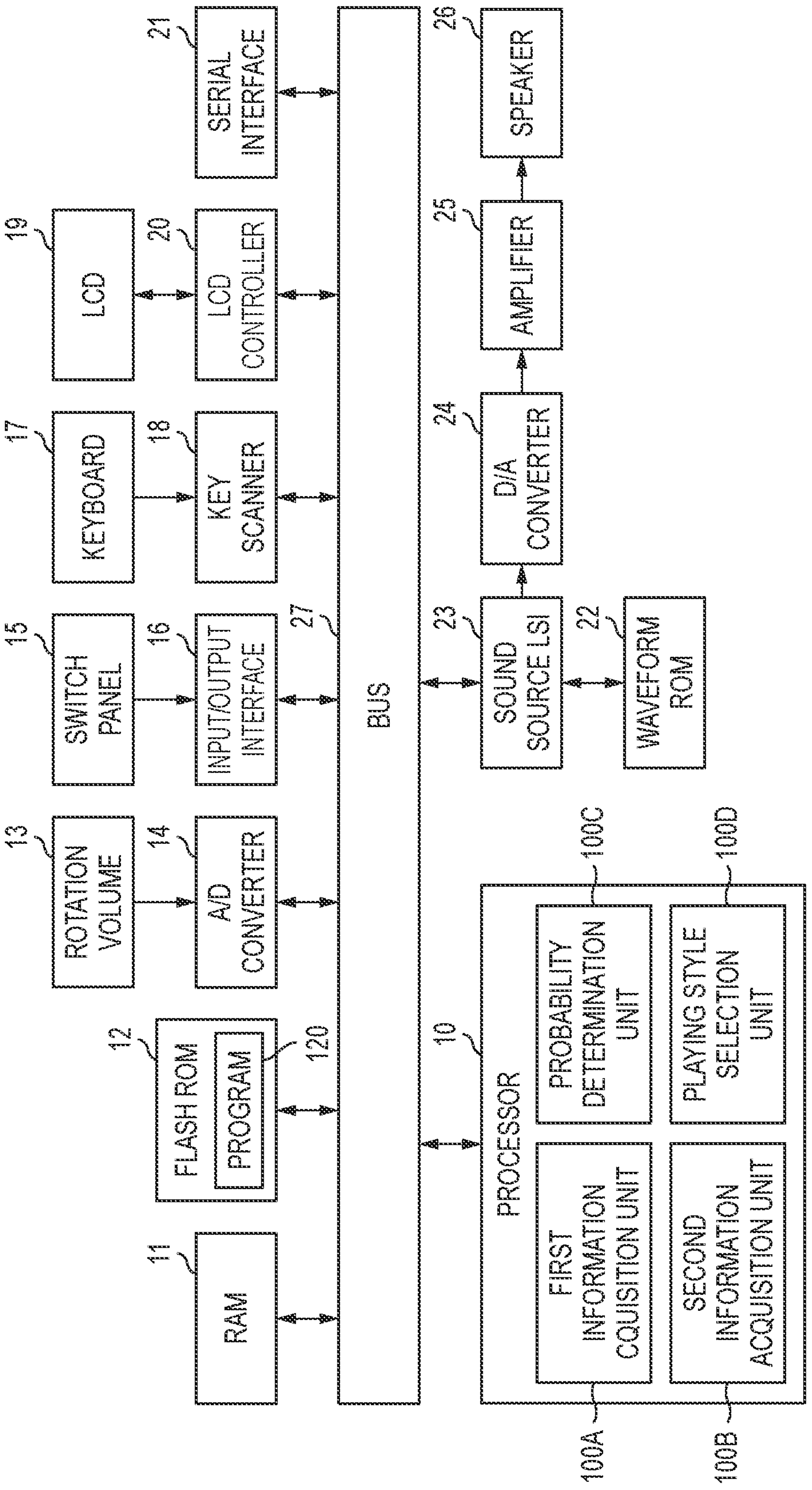
FIG. 2 is a block diagram showing a configuration of the electronic musical instrument according to the embodiment of the present disclosure.

FIG. 1 shows an appearance of an electronic musical instrument 1 that is an example of the information processing device according to an embodiment of the present disclosure. FIG. 2 is a block diagram showing a configuration of the electronic musical instrument 1. The electronic musical instrument 1 is, for example, an electronic keyboard. The electronic musical instrument 1 may be an electronic keyboard musical instrument other than the electronic keyboard.

The electronic musical instrument 1 includes, as a hardware configuration, a processor 10, a RAM (Random Access Memory) 11, a flash ROM (Read Only Memory) 12, a rotation volume 13, an A/D converter 14, a switch panel 15, an input/output interface 16, a keyboard 17, a key scanner 18, an LCD (Liquid Crystal Display) 19, an LCD controller 20, a serial interface 21, a waveform ROM 22, a sound source LSI (Large Scale Integration) 23, a D/A converter 24, an amplifier 25 and a speaker 26. Each unit of the electronic musical instrument 1 is connected by a bus 27.

The processor 10 is configured to collectively control the electronic musical instrument 1 by reading programs and data stored in the flash ROM 12 and using the RAM 11 as a work area.

The processor 10 is, for example, a single processor or a multi-processor, and includes at least one processor. In the case of a configuration including a plurality of processors, the processor 10 may be packaged as a single device, or may be configured by a plurality of devices physically separated within the electronic musical instrument 1. The processor 10 may also be called a "control unit".

The processor 10 includes, as functional blocks, a first information acquisition unit 100A, a second information acquisition unit 100B, a probability determination unit 100C, and a playing style selection unit 100D. By operations of the functional blocks, it is possible to generate a musical sound with a natural playing style suitable for performance in the electronic musical instrument 1.

The RAM 11 is configured to temporarily hold data and programs. In the RAM 11, programs and data read from the flash ROM 12 and other data required for communication are held.

The flash ROM 12 is a non-volatile semiconductor memory such as a flash memory, an erasable programmable ROM (EPROM) or an electrically erasable programmable ROM (EEPROM), and serves as a secondary storage device or an auxiliary storage device. In the flash ROM 12, programs and data that are used by the processor 10 so as to perform various processing, including a program 120, are stored.

In the present embodiment, each functional block of the processor 10 is implemented by a program 120 that is software. Note that, each functional block of the processor 10 may also be partially or entirely implemented by hardware such as a dedicated logic circuit.

The rotation volume 13 includes volumes 132, 134G, 134H and 134P. The volume 132 is an operation knob for adjusting an overall sound volume. The volume 134G is an operation knob for adjusting a probability that a musical sound will be generated with a glissando playing style. The volume 134H is an operation knob for adjusting a probability that a musical sound will be generated with a hammer-on playing style. The volume 134P is an operation knob for adjusting a probability that a musical sound will be generated with a pull-off playing style. In other words, the electronic musical instrument 1 has a means for receiving a player's operation and adjusting an occurrence probability of each playing style.

The A/D converter 14 is a device configured to convert analog voltages corresponding to volume positions of various volumes included in the rotation volume 13 into digital data. When a player operates the volume 132 or the like, a signal indicating a content of the operation is output to the processor 10 via the A/D converter 14.

The switch panel 15 is provided on a housing of the electronic musical instrument 1, and includes a switch of a mechanical, electrostatic capacity non-contact, or membrane type or the like, and an operation element such as a button, a knob, a rotary encoder, a wheel and a touch panel. By operating the switch panel 15, the player can specify, for example, a tone color (guitar, bass, piano, etc.). When the player operates the switch panel 15, a signal indicating a content of the operation is output to the processor 10 via the input/output interface 16.

The keyboard 17 is a keyboard having a plurality of white keys and black keys as a plurality of performance operation elements. The respective keys are associated with different pitches, respectively.

A key scanner 18 is configured to monitor a key pressing and a key releasing on the keyboard 17. The key scanner 18 is configured to output key press event information to the processor 10 when a player's key pressing operation is detected. The key press event information includes information (key number) about a pitch of a key related to the key pressing operation. The key number is also called a key number, a MIDI key, or a note number.

In the present embodiment, a means for measuring a key pressing speed (velocity value) is provided separately, and the velocity value measured by this means is also included in the key press event information. Illustratively, a plurality of contact switches are provided for each key. A velocity value is measured by a difference in conduction time of each contact switch when a key is pressed. The velocity value can also be called a value indicating a strength of a key pressing operation, and can also be called a value indicating a loudness (sound volume) of a musical sound.

The LCD 19 is configured to be driven by an LCD controller 20. When the LCD controller 20 drives the LCD 19 in response to a control signal from the processor 10, a screen corresponding to the control signal is displayed on the LCD 19. The LCD 19 may be replaced with a display device such as organic EL (Electro Luminescence) or LED (Light Emitting Diode). The LCD 19 may also be a touch panel.

The serial interface 21 is an interface configured to input/output MIDI data (MIDI message) in a serial format with respect to an external MIDI (Musical Instrument Digital Interface) device under control of the processor 10.

The waveform ROM 22 is configured to store a set of waveform data for each tone color (guitar, bass, piano, etc.). The set of waveform data for each tone color includes waveform data (for convenience, referred to as "waveform data group") of some (plural) key numbers among all key numbers corresponding to each key of the keyboard 17. In the present embodiment, by changing a reading speed (in other words, a pitch) of the waveform data, it is possible to generate even a musical sound of a key number not included in the waveform data group. In other words, it is possible to generate musical sounds of all key numbers corresponding to each key of the keyboard 17 by using a waveform data group including only some key numbers.

The waveform ROM 22 is configured to further store a waveform data group for each tone color with respect to each playing style. The playing style is roughly divided into a normal playing style and a special playing style. In the present embodiment, a glissando playing style, a hammer-on playing style, and a pull-off playing style are assumed as the special playing style. That is, the waveform ROM 22 is configured to store waveform data groups of a plurality of types (four, here) of playing styles (normal playing style, glissando playing style, hammer-on playing style, and pull-off playing style) for each tone color.

Note that, the special playing styles listed here are only examples. In other embodiments, other special playing styles may be applied.

The processor 10 is configured to instruct the sound source LSI 23 to read the corresponding waveform data from the plurality of waveform data stored in the waveform ROM 22. The waveform data to be read is determined according to, for example, a tone color selected by a player's operation, key press event information, and a playing style selected in processing described later (refer to FIG. 3).

The sound source LSI 23 is configured to generate a musical sound, based on the waveform data read from the waveform ROM 22 under instruction of the processor 10. The sound source LSI 23 has, for example, 128 generator sections, and can generate up to 128 musical sounds at the same time. Note that, in the present embodiment, the processor 10 and the sound source LSI 23 are configured as separate devices, but in other embodiments, the processor 10 and the sound source LSI 23 may be configured as one processor.

A digital audio signal of the musical sound generated by the sound source LSI 23 is converted into an analog signal by the D/A converter 24, amplified by the amplifier 25 and output to the speaker 26.

Figure 3:
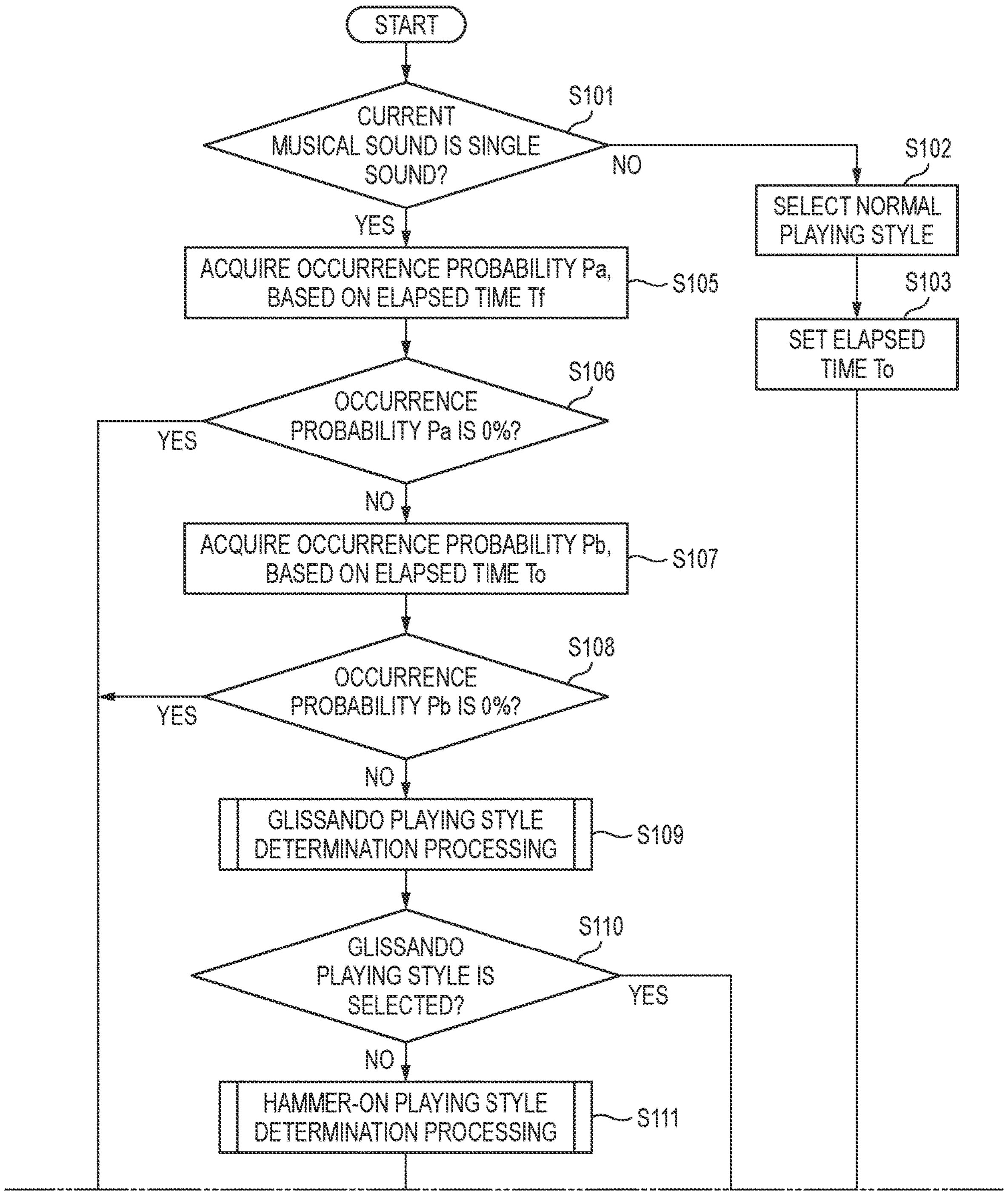
FIG. 3 is a flowchart showing processing that is executed by a processor of the electronic musical instrument upon a key pressing operation in an embodiment of the present disclosure.
Figure 4:
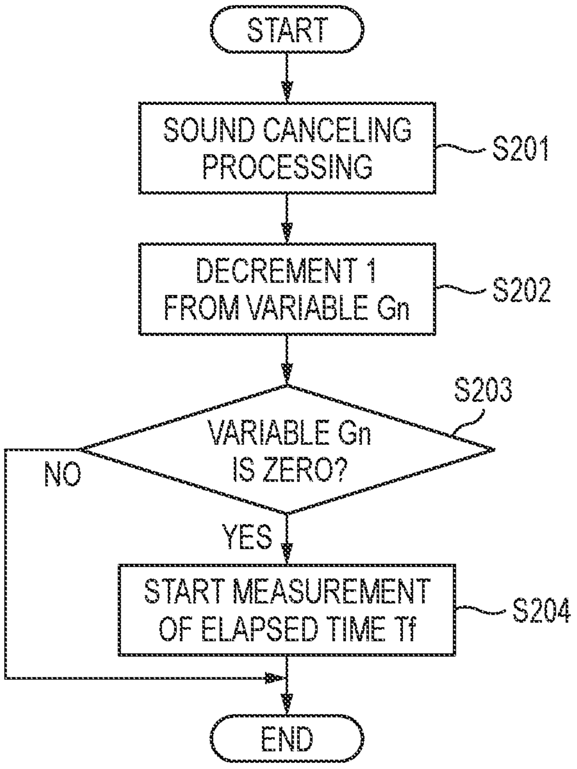
FIG. 4 is a flowchart showing processing that is executed by the processor of the electronic musical instrument upon a key releasing operation in an embodiment of the present disclosure.

FIGS. 3 and 4 are flowcharts showing processing by the processor 10 executing the program 120 in an embodiment of the present disclosure. For example, when a key pressing operation is performed by a player, execution of the processing shown in FIG. 3 is started. In addition, for example, when a key releasing operation is performed by the player, execution of the processing shown in FIG. 4 is started.

By executing the processing in FIGS. 3 and 4, it is possible to generate musical sounds with a natural playing style suitable for performance. Therefore, information processing devices other than the electronic musical instrument 1 capable of executing the program 120 are also within the scope of the present disclosure. Examples of the information processing devices other than the electronic musical instrument 1 include a smart phone, a personal computer (PC), a tablet terminal, a portable gaming machine, a feature phone, a personal digital assistant (PDA) and the like.

In the following description, as an example, a case where a plucked string instrument such as a guitar or a bass is set as a tone color is assumed.

In the processing shown in FIG. 3, first, a predetermined parameter (elapsed times To and Tf until a current musical sound is generated) about first information (described later) and second information (described later) are acquired, and based on the parameter, it is determined whether there is a possibility that a musical sound will be generated with the special playing style. When it is determined that there is a possibility that the musical sound will be generated with a special playing style, it is determined whether there is a possibility that the musical sound will be generated with the glissando playing style, based on a predetermined parameter (difference in loudness, different in interval and the like of the musical sound). When it is determined that there is a possibility that the musical sound will be generated with the glissando playing style, an occurrence probability thereof is calculated, and based on the calculated occurrence probability and a random number, it is determined whether to generate the musical sound with the glissando playing style. When the glissando playing style is selected as a result of this determination, the musical sound is generated with the glissando playing style.

When the glissando playing style is not selected, a predetermined parameter (difference in loudness and difference in interval of the musical sound, number of consecutive generations of a musical sound with the hammer-on playing style, etc.) are acquired, and based on the parameter, it is determined whether there is a possibility that the musical sound will be generated with the hammer-on playing style. When it is determined that there is a possibility that the musical sound will be generated with the hammer-on playing style, an occurrence probability thereof is calculated, and based on the calculated occurrence probability and a random number, it is determined whether to generate the musical sound with the hammer-on playing style. When the hammer-on playing style is selected as a result of this determination, the musical sound is generated with the hammer-on playing style.

When the hammer-on playing style is not selected, a predetermined parameter (difference in loudness and difference in interval of the musical sound, number of consecutive sound generations of a musical sound with the pull-off playing style, etc.) are acquired, and based on the parameter, it is determined whether there is a possibility that the musical sound will be generated with the pull-off playing style. When it is determined that there is a possibility that the musical sound will be generated with the pull-off playing style, an occurrence probability thereof is calculated, and based on the calculated occurrence probability and a random number, it is determined whether to generate the musical sound with the pull-off playing style. When the pull-off playing style is selected as a result of this determination, the musical sound is generated with the pull-off playing style.

When none of the above special playing styles are selected, the musical sound is generated with the normal playing style.

In this way, the processor 10 acquires a predetermined parameter, determines a probability that a special playing style will be selected, based on the acquired parameter, and selects a playing style according to the determined probability. Incidentally, the processor 10 operates as a probability determination unit 100C configured to determine a probability that a special playing style will be selected. In addition, the processor 10 operates as a playing style selection unit 100D configured to select a playing style according to the determined probability.

Note that, in the present embodiment, the possibility of sound generation is determined in the order of the glissando playing style, the hammer-on playing style, and the pull-off playing style, but this order is only an example. This order can be changed as appropriate.

In the following description, a musical sound corresponding to a key pressing operation that becomes a trigger for starting execution of the processing in FIG. 3 is described as "second musical sound", and a musical sound played or generated earlier than the second musical sound (e.g., one before the second musical sound) is described as "first musical sound". In addition, in this specification, the first musical sound is sometimes called "previous musical sound", and the second musical sound is sometimes called "current musical sound".

Information about the first musical sound is described as "first information". The first information includes, for example, key press event information (key number, velocity value) corresponding to the first musical sound, elapsed time Tf (unit: msec) after contact of a playing means (a finger, a pick, etc. on a fret side) is released (predetermined operation) from the string of the plucked musical instrument that generates the first musical sound (single sound) (i.e., after the string is released), elapsed time To (unit: msec) after the first musical sound (single sound) is generated, and a playing style at a time of sound generation. Note that, the elapsed time Tf is actually an elapsed time after "key is released", but is described as "string is released", for convenience.

Information about the second musical sound is described as "second information". The second information includes, for example, key press event information (key number, velocity value) corresponding to the second musical sound.

The processor 10 holds the first information and the second information in a work area of the RAM 11, for example. That is, the processor 10 operates as a first information acquisition unit 100A configured to acquire first information about a first musical sound, and as a second information acquisition unit 100B configured to acquire second information about a second musical sound generated later than the first musical sound.

In the processing shown in FIG. 3, the processor 10 first determines whether a current musical sound is a single sound (step S101).

Specifically, in step S101, the processor 10 determines whether a variable Gn (Gn is a natural number) is zero. The variable Gn indicates the number of musical sounds being currently generated. When the variable Gn is zero, only the current musical sound is generated. For this reason, in step S101, it is determined that the current musical sound is a single sound. When the variable Gn is not zero, two or more musical sounds are generated at the same time. For this reason, in step S101, it is determined that the current musical sound becomes a chord playing.

In the case of a chord playing, it is difficult to generate sounds with the special playing style. In addition, in the electronic musical instrument 1, which is a keyboard musical instrument, it is difficult to perform a special playing style by playing chords (e.g., moving fingers in parallel while pressing a plurality of keys). For this reason, when it is determined that the current musical sound becomes a chord playing (step S101: NO), the processor 10 selects the normal playing style as the playing style for generating the current musical sound (step S102).

The processor 10 instructs the sound source LSI 23 to read out the waveform data of the normal playing style corresponding to the key press event information of the current musical sound from the plurality of waveform data stored in the waveform ROM 22. Thereby, the current musical sound is generated with the normal playing style.

The processor 10 sets a large value (for example, a value of 10,000) as the elapsed time To (step S103), increments the variable Gn by 1 (step S104), and ends the processing shown in FIG. 3. The elapsed time To set here is treated as one of the pieces of first information during the processing in FIG. 3 that is executed by a next key pressing operation as a trigger.

Here, the processing shown in FIG. 4 is described. The processing shown in FIG. 4 is executed in parallel with the processing shown in FIG. 3 when a key releasing operation is performed.

As shown in FIG. 4, the processor 10 performs sound canceling processing for a musical sound corresponding to a key-released key by using a predetermined envelope corresponding to the key releasing operation (step S201).

The processor 10 decrements 1 from the variable Gn (step S202).

The processor 10 determines whether the variable Gn (i.e., the number of musical sounds being currently generated) is zero (step S203). When it is determined that the variable Gn is zero (i.e., the musical sound at the time of key release is a single sound) (step S203: YES), the processor 10 resets the elapsed time Tf to zero, starts measurement of the elapsed time Tf (step S204), and ends the processing shown in FIG. 4. When it is determined that the variable Gn is not zero (step S203: NO), the processor 10 ends the processing shown in FIG. 4 without starting measurement of the elapsed time Tf. Here, the elapsed time Tf for which measurement is started is treated as one of the pieces of first information in the processing in FIG. 3 that is executed by a next key pressing operation as a trigger.

Returning to the description of the processing shown in FIG. 3, when it is determined that the current musical sound is a single sound (step S101: YES), the processor 10 executes processing of step S105 and thereafter and selects a playing style at a time of generating the current musical sound, from the plurality of types of playing styles, based on the first information and the second information.

First, the processor 10 acquires an occurrence probability Pa, based on the elapsed time Tf, which is one of the pieces of first information (step S105). The occurrence probability Pa is used when calculating the probability that the current musical sound will be generated with the special playing style. The occurrence probability Pa may be acquired as a first occurrence probability.

Figure 5:
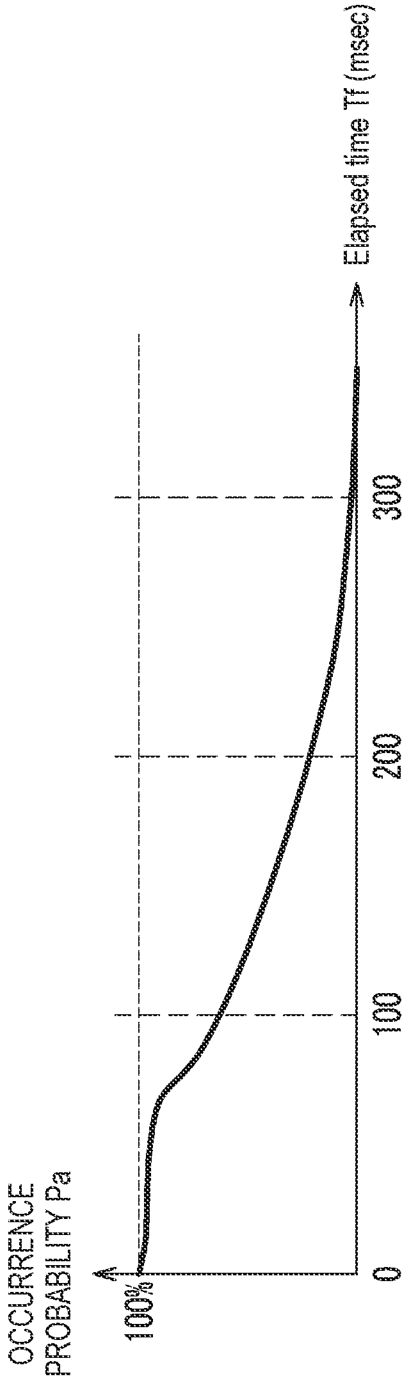
FIG. 5 shows a function (a relationship between an elapsed time Tf and an occurrence probability Pa) that is used for calculating a probability that a musical sound will be generated with a special playing style in an embodiment of the present disclosure.

FIG. 5 shows a function indicating a relationship between the elapsed time Tf and the occurrence probability Pa. The function shown in FIG. 5 is stored in the flash ROM 12, for example. In FIG. 5, the vertical axis indicates the occurrence probability Pa (unit: %), and the horizontal axis indicates the elapsed time Tf (unit: msec). As described above, the elapsed time Tf indicates an elapsed time since the string release when the previous musical sound (single sound) was generated.

In step S105, the processor 10 acquires an occurrence probability Pa corresponding to the current elapsed time Tf (in other words, the elapsed time after the string is release until the current musical sound is generated) by using the function shown in FIG. 5.

In the case where the time interval after the string release of the previous musical sound until the current musical sound is generated (for example, when playing a fast passage) is shorter, it means, for example, a state in which the string vibration does not converge and the energy of sound generation remains. Therefore, it is physically difficult to generate the current musical sound as usual (with the normal playing style). For this reason, the shorter the elapsed time since the string release is, the higher the occurrence probability Pa is set. From another standpoint, as the elapsed time since the string release is longer, the string vibration converges and the energy of sound generation disappears. Therefore, it is difficult to generate the musical sound at a sufficient sound volume with the special playing style even when the special playing style is performed with the plucked string instrument. For this reason, the longer the elapsed time since the string release is, the lower the occurrence probability Pa is set.

Note that, in the present embodiment, in the reproduction of the plucked string instrument by the electronic musical instrument 1, it is regarded that immediately after the string release, the string vibration is hardly attenuated and the energy of sound generation remains with almost no loss. For this reason, in FIG. 5, in the first several tens of msec, the occurrence probability Pa is set to a value close to 100%. In this way, by setting the occurrence probability Pa to a value close to 100% when the elapsed time Tf is extremely short, a probability that a sound will be generated with a special playing style can be brought closer to a more natural probability.

When it is determined that the occurrence probability Pa acquired in step S105 is 0% (step S106: YES), the probability that a sound will be generated with a special playing style also becomes 0%. In this case, the processor 10 selects the normal playing style as the playing style at the time of generating the current musical sound (step S115).

When it is determined that the occurrence probability Pa acquired in step S105 is greater than 0% (step S106: NO), the processor 10 acquires the occurrence probability Pb, based on the elapsed time To, which is one of the pieces of first of information (step S107). The occurrence probability Pb is also used when calculating the probability that the current musical sound will be generated with the special playing style. The occurrence probability Pb may be acquired as a second occurrence probability.

Figure 6:
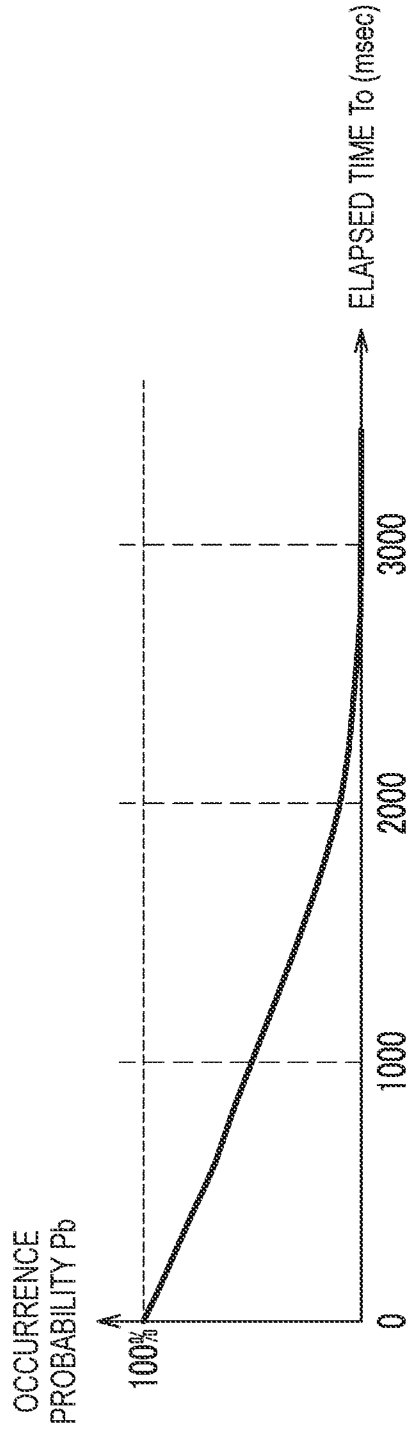
FIG. 6 shows a function (a relationship between an elapsed time To and an occurrence probability Pb) that is used for calculating a probability that a musical sound will be generated with a special playing style in an embodiment of the present disclosure.

FIG. 6 shows a function indicating a relationship between the elapsed time To and the occurrence probability Pb. The function shown in FIG. 6 is stored in the flash ROM 12, for example. In FIG. 6, the vertical axis indicates the occurrence probability Pb (unit: %), and the horizontal axis indicates the elapsed time To (unit: msec). As described above, the elapsed time To indicates an elapsed time since the previous musical sound (single sound) is generated.

In step S107, the processor 10 acquires the occurrence probability Pb corresponding to the current elapsed time TO (in other words, the elapsed time after the musical sound of the previous single sound is generated until the current musical sound is generated) by using the function shown in FIG. 6.

Even when the string is not released, the string vibration is attenuated over time, and the energy of sound generation of the previous musical sound is also reduced. In addition, as time elapses since the previous musical sound is generated, the player is given more spare time for performance operation, so that a plucking possibility by the normal playing style increases regardless of the attenuation of string vibration. Taking these into consideration, the shorter the elapsed time To is, the higher the occurrence probability Pb is set. In other words, the longer the elapsed time To is, the lower the occurrence probability Pb is set.

Note that, the occurrence probability Pb varies greatly depending on how much the player is given spare time for performance operation. For this reason, the function shown in FIG. 6 is determined, mainly considering the change in spare time for performance operation corresponding to the elapse of time.

It is rare for a musical sound to be generated with a special playing style after playing chords. For this reason, in the present embodiment, the previous musical sound serving as the starting point of the elapsed times Tf and To is set to a single sound.

When it is determined that the occurrence probability Pb acquired in step S107 is 0% (step S108: YES), the probability that a sound will be generated with a special playing style also becomes 0%. Also in this case, the processor 10 selects the normal playing style as the playing style at the time of generating the current musical sound (step S115).

When it is determined that the occurrence probability Pb acquired in step S107 is greater than 0% (step S108: NO), the processor 10 executes glissando playing style determination processing (step S109).

Figure 7:
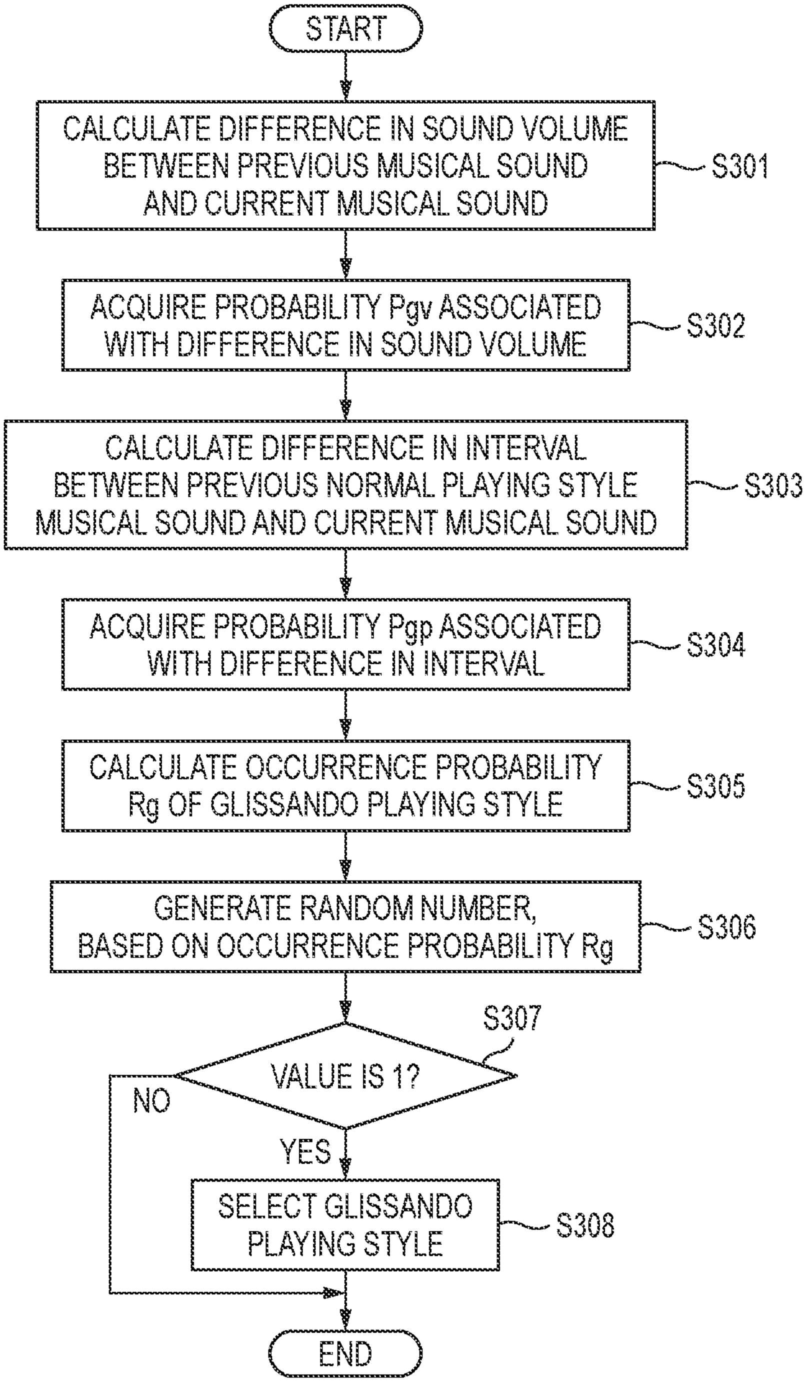
FIG. 7 is a subroutine showing details of glissando playing style determination processing of step S109 in FIG. 3.

FIG. 7 is a subroutine showing details of the glissando playing style determination processing of step S109 in FIG. 3. FIG. 8 shows a table in which a difference between the velocity value of the previous musical sound and the velocity value of the current musical sound (in other words, difference in sound volume) (unit: %) and a probability Pgv (unit: %) that a musical sound will be generated with the glissando playing style are associated. FIG. 9 shows a table in which a difference in interval (unit: fret or half tone) between the previous musical sound and the current musical sound and a probability Pgp (unit: %) that a musical sound will be generated with the glissando playing style are associated. The tables shown in FIGS. 8 and 9 are stored in the flash ROM 12, for example. The probability Pgv may be set as a third occurrence probability, and the probability Pgp may be set as a fourth occurrence probability.

As described above, the first information and the second information held in the work area of the RAM 11 include the velocity value of the previous musical sound and the velocity value of the current musical sound, respectively. The processor 10 calculates a difference in sound volume between the previous musical sound and the current musical sound from the velocity values (step S301).

When the velocity value of the previous musical sound and the velocity value of the current musical sound are the same, the difference in sound volume calculated in step S301 becomes zero. When the velocity value of the current musical sound is larger than the velocity value of the previous musical sound, the difference in sound volume calculated in step S301 becomes a positive value. When the velocity value of the current musical sound is smaller than the velocity value of the previous musical sound, the difference in sound volume calculated in step S301 becomes a negative value. For example, when the velocity value of the current musical sound is 1.5 times the velocity value of the previous musical sound, the difference in sound volume is indicated by +50% in FIG. 8.

The processor 10 acquires the probability Pgv associated with the difference in sound volume calculated in step S301 from the table shown in FIG. 8 (step S302).

The closer the loudness of the current musical sound to the loudness of the previous musical sound is (the smaller the change in sound volume is), the higher the probability that the current musical sound will be generated with the glissando playing style is. Incidentally, due to the characteristic that the current musical sound is generated with the glissando playing style using the energy corresponding to the string vibration at the time of sound generation of the previous musical sound, the larger the loudness of the current musical sound with respect to the loudness of the previous musical sound is, the lower the probability that the current musical sound will be generated with the glissando playing style is. In addition, it is difficult for the loudness of the musical sound to be larger or extremely smaller than that of the previous musical sound by the glissando playing style. For this reason, in FIG. 8, as the difference in sound volume is closer to zero, the probability Pgv of the larger value is associated. Note that, among the musical sounds that are consecutively generated during the special playing style, the sound volume of the musical sound that is generated later tends to decrease. For this reason, in FIG. 8, when the difference in sound volume is negative, the probability Pgv of the larger value is associated, as compared with the case where the difference in sound volume is positive.

As described above, the first information and the second information held in the work area of the RAM 11 include the key number of the previous musical sound and the key number of the current musical sound, respectively. More specifically, in the work area of the RAM 11, as the first information, not only information about the musical sound generated one before the current musical sound but also information about a plurality of musical sounds (e.g., musical sound generated two before the current musical sound, musical sound generated three before the current musical sounds, etc.) are held.

The processor 10 calculates a difference (i.e., difference in interval) between the key number of the previous musical sound and the key number of the current musical sound (step S303). As used herein, the "previous musical sound" refers to a musical sound last generated with the normal playing style, among a plurality of first musical sounds corresponding to each of a plurality of pieces of first information held in the work area of RAM 11. For convenience, this musical sound is described as "previous normal playing style musical sound".

When the key number of the previous normal playing style musical sound is the same as the key number of the current musical sound, the difference in interval calculated in step S303 ("the number of moved frets" in FIG. 9) becomes zero. When the key number of the current musical sound is higher than the key number of the previous normal playing style musical sound, the difference in interval calculated in step S303 becomes a positive value. When the key number of the current musical sound is lower than the key number of the previous normal playing style musical sound, the difference in interval calculated in step S303 becomes a negative value.

The processor 10 acquires the probability Pgp associated with the difference in interval calculated in step S303 from the table shown in FIG. 9 (step S304).

The glissando playing style has a limitation on speed. In the plucked string instrument, the farther the key (in other words, the fret) of the first musical sound to be generated with the glissando playing style is from the key (in other words, the fret) during the immediately previous normal playing style, the more difficult it becomes the player to move a finger or the like between the two frets instantly (specifically, at the speed at which a sound is generated with the glissando playing style). For this reason, the greater the difference in interval between the current musical sound and the previous normal playing style musical sound is, the lower a probability that the current musical sound will be generated with the glissando playing style is.

Therefore, in FIG. 9, as the difference in interval is closer to zero, the probability Pgp of the larger value is associated. However, when the difference in interval is zero, the glissando playing style is not applied. Therefore, in this case, the probability Pgp becomes zero, and the probability that a musical sound will be generated with the glissando playing style also becomes zero.

In addition, when the difference in interval is large, there is a high possibility that a string for generating the current musical sound is different from a string for generating the previous normal playing style musical sound. Therefore, in the present embodiment, when the difference in interval is ±4 half tones or more, it is regarded that the glissando playing style is not applied. Also in this case, the probability Pgp becomes zero, and the probability that a musical sound will be generated with the glissando playing style also becomes zero.

The processor 10 calculates an occurrence probability Rg (unit: %) of the glissando playing style (step S305). Specifically, the processor 10 calculates the occurrence probability Rg by a following equation. The coefficient Cg is a value set in response to an operation on the volume 134G, and takes a value of 0 to 100, for example.

$$Rg=Cg\times(Pa\times Pb\times Pgv\times Pgp)\times 10\text{-}6$$

The processor 10 generates a random number by a random function (step S306). The random number takes a value of 0 or 1. More specifically, in step S306, the processor 10 generates a random number so that the value 1 is obtained with the occurrence probability Rg calculated in step S305.

When it is determined that the value 1 is obtained (step S307: YES), the processor 10 selects the glissando playing style as the playing style for generating the current musical sound (step S308), and ends the subroutine shown in FIG. 7. Since the glissando playing style has been selected (step S110: YES), the processor 10 advances the flowchart shown in FIG. 3 to processing of step S116.

Further, the processor 10 instructs the sound source LSI 23 to read out the waveform data of the glissando playing style corresponding to the key press event information of the current musical sound from the plurality of waveform data stored in the waveform ROM 22. Thereby, the current musical sound is generated with the glissando playing style.

When it is determined that the value 0 is obtained (step S307: NO), the processor 10 ends the subroutine shown in FIG. 7 without selecting the glissando playing style as the playing style for generating the current musical sound. Since the glissando playing style has not been selected (step S110: NO), the processor 10 advances the flowchart shown in FIG. 3 to hammer-on playing style determination processing of step S111.

In this way, the processor 10 determines the probability that the glissando playing style will be selected, based on the elapsed time Tf after the string is released until the current musical sound is generated.

In addition, the processor 10 determines the probability that the glissando playing style will be selected, based on the elapsed time To after the musical sound of the previous single sound is generated until the current musical sound is generated.

Further, the processor 10 determines the probability that the glissando playing style will be selected, as a higher value as the elapsed times Tf and To are shorter.

Further, the processor 10 determines the probability that the glissando playing style will be selected, based on the loudness of the previous musical sound and the loudness of the current musical sound. More specifically, the processor 10 determines the probability that the glissando playing style will be selected, as a higher value as the difference in sound volume calculated in step S301 is smaller.

Further, the processor 10 determines the probability that the glissando playing style will be selected, based on the difference in interval between the previous musical sound and the current musical sound. More specifically, the processor 10 determines the probability that the glissando playing style will be selected, as a higher value as the difference in interval calculated in step S303 is smaller.

Figure 10:
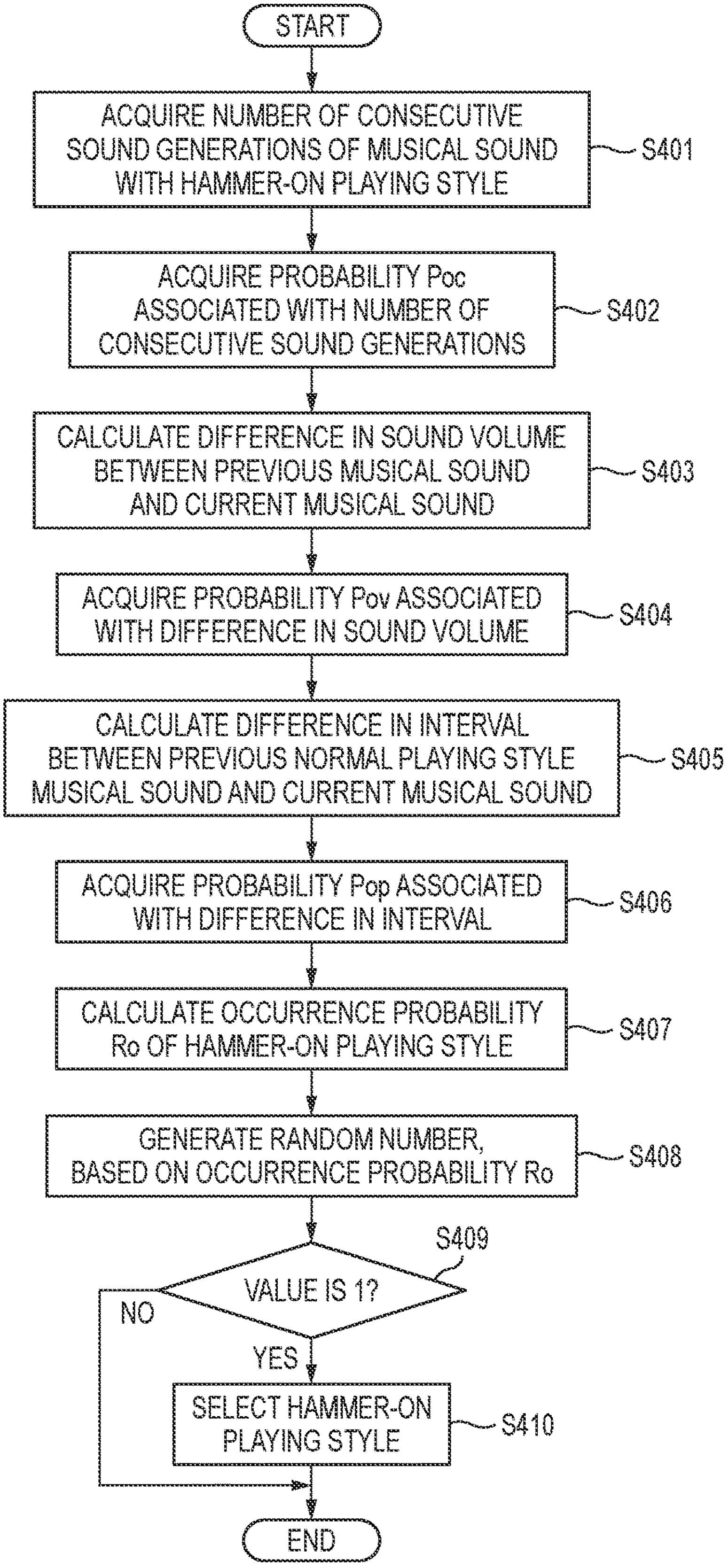
FIG. 10 is a subroutine showing details of hammer-on playing style determination processing of step S111 in FIG. 3.

FIG. 10 is a subroutine showing details of hammer-on playing style determination processing of step S111 in FIG. 3. FIG. 11 shows a table in which the number of consecutive sound generations of a musical sound with the hammer-on playing style (number of consecutive sound generations within a predetermined time at a time point at which the previous musical sound is generated. The current musical sound that is generated after the previous musical sound is assumed to be the 0th musical sound) and a probability Poc (unit: %) that a musical sound will be generated with the hammer-on playing style are associated. FIG. 12 shows a table in which a difference between the velocity value of the previous musical sound and the velocity value of the current musical sound (in other words, difference in sound volume) (unit: %) and a probability Pov (unit: %) that a musical sound will be generated with the hammer-on playing style are associated. FIG. 13 shows a table in which a difference in interval (unit: fret or half tone) between the previous normal playing style musical sound and the current musical sound and a probability Pop (unit: %) that a musical sound will be generated with the hammer-on playing style are associated. Tables shown in FIGS. 11 to 13 are stored in the flash ROM 12, for example. The probability Pov may be set as a fifth occurrence probability, the probability Pop may be set as a sixth occurrence probability, and the probability Poc may be set as a seventh occurrence probability.

In processing of step S117 described later, the number of consecutive sound generations of a musical sound with the hammer-on playing style is counted. The processor 10 acquires the count value (step S401).

The processor 10 acquires the probability Poc associated with the number of consecutive sound generations acquired in step S401 from the table shown in FIG. 11 (step S402).

In a plucked string instrument, when generating a musical sound with a hammer-on playing style, the number of consecutive sound generations has a limitation on the number of fingers used for performance operation. For example, a case where a musical sound is generated with the normal playing style of plucking a string with an index finger is considered. In this case, when raising an interval with the hammer-on playing style, a player can only play up to three consecutive times using the three fingers of the middle finger, the ring finger, and the small finger. For this reason, as the number of consecutive sound generations increases, as shown in FIG. 11, the probability that the current musical sound will be generated with the hammer-on playing style decreases.

The processor 10 calculates a difference in sound volume between the previous musical sound and the current musical sound from the velocity value of the previous musical sound included in the first information and the velocity value of the current musical sound included in the second information (step S403).

The processor 10 acquires the probability Pov associated with the difference in sound volume calculated in step S403 from the table shown in FIG. 12 (step S404). Note that, in this subroutine, the difference in sound volume calculated in step S301 in FIG. 7 may be used. In this case, the processing of step S403 can be omitted.

The closer the loudness of the current musical sound to the loudness of the previous musical sound is (the smaller the change in sound volume is), the higher the probability that the current musical sound will be generated with the hammer-on playing style is. Incidentally, due to the characteristic that the current musical sound is generated with the hammer-on playing style using the energy corresponding to the string vibration at the time of sound generation of the previous musical sound, the larger the loudness of the current musical sound with respect to the loudness of the previous musical sound is, the lower the probability that the current musical sound will be generated with the hammer-on playing style is. For this reason, in FIG. 12, as the difference in sound volume is closer to zero, the probability Pgv of the larger value is associated.

The processor 10 calculates a difference in interval between the previous musical sound and the current musical sound from the key number of the previous normal playing style musical sound included in the first information and the key number of the current musical sound included in the second information (step S405).

The processor 10 acquires the probability Pop associated with the difference in interval calculated in step S405 from the table shown in FIG. 13 (step S406). Note that, in this subroutine, the difference in interval calculated in step S303 in FIG. 7 may be used. In this case, the processing of step S405 can be omitted.

In a plucked musical instrument, when generating a musical sound with a hammer-on playing style, the player needs to press two frets at the same time. For this reason, the size of the hand pressing the two frets at the same time leads to a limitation on the width of the musical scale that can be achieved with the hammer-on playing style. For this reason, the greater the difference in interval between the current musical sound and the previous normal playing style musical sound is, the lower the probability that the current musical sound will be generated with the hammer-on playing style is.

Therefore, in FIG. 13, as the difference in interval is closer to zero, the probability Pop of the larger value is associated. However, when the difference in interval is zero, the hammer-on playing style is not applied. Therefore, in this case, the probability Pop becomes zero, and the probability that a musical sound will be generated by the hammer-on playing style also becomes zero.

The processor 10 calculates an occurrence probability Ro (unit: %) of the hammer-on playing style (step S407). Specifically, the processor 10 calculates the occurrence probability Ro by a following equation. The coefficient Co is a value set in response to an operation on the volume 134H, and takes a value of 0 to 100, for example.

$$Ro=Co\times(Pa\times Pb\times Pov\times Pop)\times 10\text{-}6$$

The processor 10 generates a random number so that the value 1 is obtained with the occurrence probability Ro calculated in step S407 (step S408).

When it is determined that the value 1 is obtained (step S409: YES), the processor 10 selects the hammer-on playing style as the playing style for generating the current musical sound (step S410), and ends the subroutine shown in FIG. 10. Since the hammer-on playing style has been selected (step S112: YES), the processor 10 advances the flowchart shown in FIG. 3 to processing of step S116.

Further, the processor 10 instructs the sound source LSI 23 to read out the waveform data of the hammer-on playing style corresponding to the key press event information of the current musical sound, from the plurality of waveform data stored in the waveform ROM 22. Thereby, the current musical sound is generated with the hammer-on playing style.

When it is determined that the value 0 is obtained (step S409: NO), the processor 10 ends the subroutine shown in FIG. 10 without selecting the hammer-on playing style as the playing style for generating the current musical sound. Since the hammer-on playing style has not been selected (step S112: NO), the processor 10 advances the flowchart shown in FIG. 3 to pull-off playing style determination processing of step S113.

In this way, the processor 10 determines the probability that the hammer-on playing style will be selected, based on the elapsed time Tf after the string is released until the current musical sound is generated.

In addition, the processor 10 determines the probability that the hammer-on playing style will be selected, based on the elapsed time To after the musical sound of the previous single sound is generated until the current musical sound is generated.

Further, the processor 10 determines the probability that the hammer-on playing style will be selected, as a higher value as the elapsed times Tf and To are shorter.

Further, the processor 10 measures the number of consecutive sound generations of a musical sound with the hammer-on playing style, and determines the probability that the hammer-on playing style will be selected, based on the measured number of consecutive sound generations.

Further, the processor 10 determines the probability that the hammer-on playing style will be selected, based on the loudness of the previous musical sound and the loudness of the current musical sound. More specifically, the processor 10 determines the probability that the hammer-on playing style will be selected, as a higher value as the difference in sound volume calculated in step S403 is smaller.

Further, the processor 10 determines the probability that the hammer-on playing style will be selected, based on the difference in interval between the previous musical sound and the current musical sound. More specifically, the processor 10 determines the probability that the hammer-on playing style will be selected, as a lower value as the key number (pitch) of the current musical sound is higher with respect to that of the previous musical sound.

Figure 14:
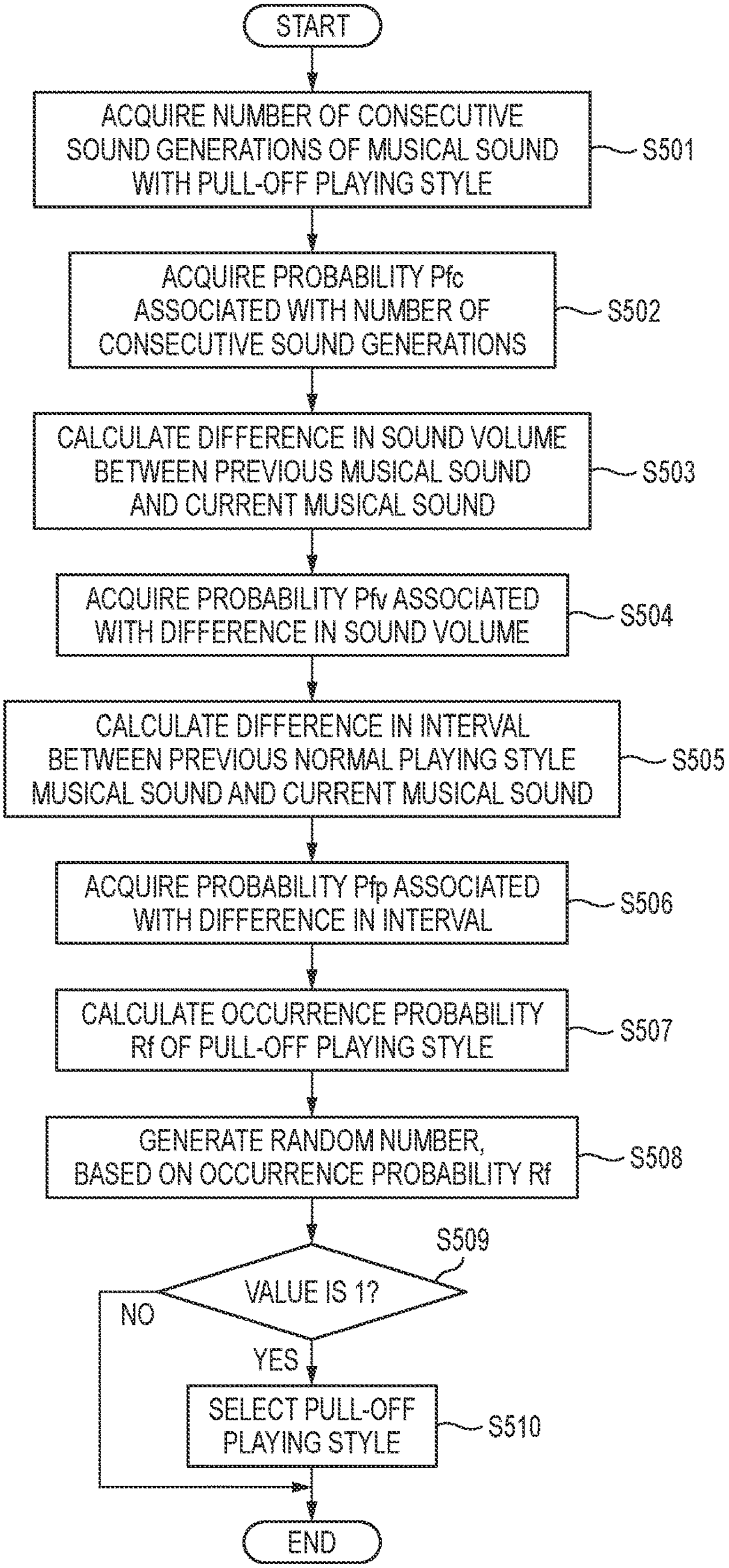
FIG. 14 is a subroutine showing details of pull-off playing style determination processing of step S113 in FIG. 3.

FIG. 14 is a subroutine showing details of pull-off playing style determination processing of step S113 in FIG. 3. FIG. 15 shows a table in which the number of consecutive sound generations of a musical sound with the pull-off playing style (number of consecutive sound generations within a predetermined time at a time point at which the previous musical sound is generated. The current musical sound that is generated after the previous musical sound is assumed to be the 0th musical sound) and a probability Pfc (unit: %) that the musical sound will be generated with the pull-off playing style are associated. FIG. 16 shows a table in which a difference between the velocity value of the previous musical sound and the velocity value of the current musical sound (in other words, difference in sound volume) (unit: %) and a probability Pfv (unit: %) that a musical sound will be generated with the pull-off playing style are associated. FIG. 17 shows a table in which a difference in interval (unit: fret or half tone) between the previous normal playing style musical sound and the current musical sound and a probability Pfp (unit: %) that a musical sound will be generated with the pull-off playing style are associated. Tables shown in FIGS. 15 to 17 are stored in the flash ROM 12, for example. The probability Pfv may be set as an eighth occurrence probability, the probability Pfp may be set as a ninth occurrence probability, and the probability Pfc may be set as a tenth occurrence probability.

In processing of step S117 described later, the number of consecutive sound generations of a musical sound with the pull-off playing style is counted. The processor 10 acquires the count value (step S501).

The processor 10 acquires the probability Pfc associated with the number of consecutive sound generations acquired in step S501 from the table shown in FIG. 15 (step S502).

Similarly to the hammer-on playing style, also in the pull-off playing style, the number of consecutive sound generations has a limitation on the number of fingers used for performance operation. For example, a case where a musical sound is generated with the normal playing style of plucking a string with a small finger is considered. In this case, when lowering an interval with the pull-off playing style, a player can only play up to three consecutive times using the three fingers of the ring finger, the middle finger, and the index finger. Therefore, as the number of consecutive sound generations increases, as shown in FIG. 15, the probability that the current musical sound will be generated with the pull-off playing style decreases.

The processor 10 calculates a difference in sound volume between the previous musical sound and the current musical sound from the velocity value of the previous musical sound included in the first information and the velocity value of the current musical sound included in the second information (step S503).

The processor 10 acquires the probability Pfv associated with the difference in sound volume calculated in step S503 from the table shown in FIG. 16 (step S504). Note that, in this subroutine, the difference in sound volume calculated in step S301 in FIG. 7 may be used. In this case, the processing of step S503 can be omitted.

The closer the loudness of the current musical sound to the loudness of the previous musical sound is (the smaller the change in sound volume is), the higher the probability that the current musical sound will be generated with the pull-off playing style is, similarly to the hammer-on playing style. For this reason, in FIG. 16, as the difference in sound volume is closer to zero, the probability Pfv of the larger value is associated.

The processor 10 calculates a difference in interval between the previous musical sound and the current musical sound from the key number of the previous normal playing style musical sound included in the first information and the key number of the current musical sound included in the second information (step S505).

The processor 10 acquires the probability Pfp associated with the difference in interval calculated in step S505 from the table shown in FIG. 17 (step S506). Note that, in this subroutine, the difference in interval calculated in step S303 in FIG. 7 may be used. In this case, the processing of step S505 can be omitted.

Similarly to the hammer-on playing style, the size of the hand pressing the two frets at the same time leads to a limitation on the width of the musical scale that can be achieved with the pull-off playing style. For this reason, the greater the difference in interval between the current musical sound and the previous normal playing style musical sound is, the lower the probability that the current musical sound will be generated with the pull-off playing style is.

Therefore, in FIG. 17, as the difference in interval is closer to zero, the probability Pfp of the larger value is associated. However, when the difference in interval is zero, the pull-off playing style is not applied. Therefore, in this case, the probability Pfp becomes zero, and the probability that the musical sound will be generated by the pull-off playing style also becomes zero.

The processor 10 calculates an occurrence probability Rf (unit: %) of the pull-off playing style (step S507). Specifically, the processor 10 calculates the occurrence probability Rf by a following equation. The coefficient Cf is a value set in response to an operation on the volume 134P, and takes a value of 0 to 100, for example.

$$Rf=Cf\times(Pa\times Pb\times Pfv\times Pfp)\times 10\text{-}6$$

The processor 10 generates a random number so that the value 1 is obtained with the occurrence probability Rf calculated in step S507 (step S508).

When it is determined that the value 1 is obtained (step S509: YES), the processor 10 selects the pull-off playing style as the playing style for generating the current musical sound (step S510), and ends the subroutine shown in FIG. 14. Since the pull-off playing style has been selected (step S114: YES), the processor 10 advances the flowchart shown in FIG. 3 to processing of step S116.

Further, the processor 10 instructs the sound source LSI 23 to read out the waveform data of the pull-off playing style corresponding to the key press event information of the current musical sound, from the plurality of waveform data stored in the waveform ROM 22. Thereby, the current musical sound is generated with the pull-off playing style.

When it is determined that the value 0 is obtained (step S509: NO), the processor 10 ends the subroutine shown in FIG. 14 without selecting the pull-off playing style as the playing style for generating the current musical sound. In this case, since no special playing style has been selected (step S114: NO), the processor 10 selects the normal playing style as the playing style for generating the current musical sound (step S115), and proceeds to processing of step S116.

In this way, the processor 10 determines the probability that the pull-off playing style will be selected, based on the elapsed time Tf after the string is released until the current musical sound is generated.

Further, the processor 10 determines the probability that the pull-off playing style will be selected, based on the elapsed time To after the musical sound of the previous single sound is generated until the current musical sound is generated.

Also, the processor 10 determines the probability that the pull-off playing style will be selected, as a higher value as the elapsed times Tf and To are shorter.

Further, the processor 10 measures the number of consecutive sound generations of a musical sound with the pull-off playing style, and determines the probability that the pull-off playing style will be selected, based on the measured number of consecutive sound generations.

Further, the processor 10 determines the probability that the pull-off playing style will be selected, based on the loudness of the previous musical sound and the loudness of the current musical sound. More specifically, the processor 10 determines the probability that pull-off playing style will be selected, as a higher value as the difference in sound volume calculated in step S403 is smaller.

Further, the processor 10 determines the probability that the pull-off playing style will be selected, based on the difference in interval between the previous musical sound and the current musical sound. More specifically, the processor 10 determines the probability that pull-off playing style will be selected, as a lower value as the key number (pitch) of the current musical sound is lower with respect to that of the previous musical sound.

In step S116, the processor 10 resets the elapsed time To to zero, and then starts measurement of the elapsed time To.

The processor 10 updates the counter (step S117).

Specifically, when the hammer-on playing style is selected in step S410 in FIG. 10, the processor 10 increments the count value of the counter corresponding to the hammer-on playing style by 1, and resets the counter value of the counter corresponding to the pull-off playing style to zero. When the pull-off playing style is selected in step S510 in FIG. 14, the processor 10 increments the count value of the counter corresponding to the pull-off playing style by 1 and resets the count value of the counter corresponding to the hammer-on playing style to zero. Note that, when the glissando playing style or the normal playing style is selected, the processor 10 resets the count values of both counters to zero.

The processor 10 increments the variable Gn by 1 (step S104), and ends the processing shown in FIG. 3.

As described above, in the present embodiment, the musical sound by the special playing style such as the glissando playing style, the hammer-on playing style and the pull-off playing style is not simply generated at random. In the present embodiment, by calculating the occurrence probability of the musical sound by each playing style and selecting a playing style based on the calculated occurrence probability, it is possible to generate a musical sound by each playing style at a frequency close to actual performance. For this reason, in the present embodiment, the musical sound is generated with a natural playing style suitable for performance.

The present disclosure is not limited to the above-described embodiments, and can be variously modified at the implementation stage without departing from the gist of the present invention. In addition, the functions executed in the above-described embodiments may be implemented combined as appropriate as possible. In the above-described embodiments, various stages are included, and various inventions can be extracted by appropriate combinations according to a plurality of disclosed constitutional requirements. For example, even when some constitutional elements are deleted from all the constitutional elements shown in the embodiments, a configuration in which the constitutional elements are deleted can be extracted as an invention as long as the effects are obtained.

In the above, the configuration of generating a musical sound with a playing style corresponding to performance data generated by a performance operation has been described. However, for example, a configuration of generating a musical sound with a playing style corresponding to musical sound data such as MIDI data input from the serial interface 21, for example, also falls within the scope of the present disclosure.

What is claimed is:

1. An information processing device comprising:

a keyboard;

a key scanner configured to monitor keys of the keyboard to detect a key-press operation and a key-release operation thereof;

a memory storing a program; and at least one processor configured to, under control of the program stored in the memory, execute processing comprising:

acquiring first information corresponding to a first musical sound that is a musical sound of an instrument other than a keyboard instrument and second information corresponding to a second musical sound that is a musical sound of the instrument other than the keyboard instrument and that is generated after the first musical sound;

acquiring a first occurrence probability, which is an occurrence probability of a special playing style with respect to an elapsed time since an end of a predetermined operation, the predetermined operation being a key-release operation detected by the key scanner after the first musical sound is generated in response to detection of a key-press operation by the key scanner, and a second occurrence probability, which is an occurrence probability of the special playing style with respect to an elapsed time after the first musical sound is generated until the second musical sound is generated, according to the first information and the second information;

determining whether to generate the second musical sound with one of a normal playing style or the special playing style, according to the first occurrence probability and the second occurrence probability; and outputting the second musical sound generated with the determined one of the normal playing style or the special playing style.

2. The information processing device according to claim 1, wherein the special playing style comprises a plurality of types of playing styles other than the normal playing style, and wherein the processes further comprise:

acquiring a predetermined parameter corresponding to the first information and the second information, and determining whether to generate the second musical sound with one of the special playing styles, according to the predetermined parameter.

3. The information processing device according to claim 2, wherein the predetermined parameter comprises:

a velocity difference between the first musical sound and the second musical sound, and a difference in interval between the first musical sound and the second musical sound.

4. The information processing device according to claim 3, wherein the occurrence probability of each of the special playing styles is set to a higher value in advance as the velocity difference is smaller.

5. The information processing device according to claim 4, wherein the special playing style comprises a glissando playing style, wherein a third occurrence probability, which is an occurrence probability of the glissando playing style, is set to a higher value in advance as the velocity difference is smaller, wherein, within a range of a predetermined difference in interval except a case where the difference in interval is zero, a fourth occurrence probability, which is an occurrence probability of the glissando playing style, is set in advance, and wherein the processes further comprise determining whether to generate the second musical sound with the glissando playing style, according to the third occurrence probability and the fourth occurrence probability.

6. The information processing device according to claim 5, wherein the fourth occurrence probability is set to a higher value in advance as the difference in interval is smaller.

7. The information processing device according to claim 4, wherein the occurrence probability of each of the special playing styles is set to a higher value in advance as a number of consecutive sound generations within a predetermined time is smaller, the predetermined time being an elapsed time after the first musical sound is generated.

8. The information processing device according to claim 7, wherein the special playing style comprises a hammer-on playing style, wherein a fifth occurrence probability, which is an occurrence probability of the hammer-on playing style, is set to a higher value in advance as the velocity difference is smaller, wherein, within a range of a predetermined difference in interval except a case where the difference in interval is zero, a sixth occurrence probability, which is an occurrence probability of the hammer-on playing style, is set in advance, wherein a seventh occurrence probability, which is an occurrence probability of the hammer-on playing style, is set to a higher value in advance, as the number of consecutive sound generations is smaller, and wherein the processes further comprise determining whether to generate the second musical sound with the hammer-on playing style, according to the fifth occurrence probability, the sixth occurrence probability, and the seventh occurrence probability.

9. The information processing device according to claim 8, wherein the sixth occurrence probability is set to a higher value in advance as a pitch of the second musical sound is greater than that of the first musical sound and the difference in interval is smaller.

10. The information processing device according to claim 9, wherein the special playing style comprises a pull-off playing style, wherein an eighth occurrence probability, which is an occurrence probability of the pull-off playing style, is set to a higher value in advance as the velocity difference is smaller, wherein, within a range of a predetermined difference in interval except a case where the difference in interval is zero, a ninth occurrence probability, which is an occurrence probability of the pull-off playing style, is set in advance, wherein a tenth occurrence probability, which is the occurrence probability of the pull-off playing style, is set in advance, as the number of consecutive sound generations is smaller, and wherein the processes further comprise determining whether to generate the second musical sound with the pull-off playing style, according to the eighth occurrence probability, the ninth occurrence probability, and the tenth occurrence probability.

11. The information processing device according to claim 10, wherein the ninth occurrence probability is set to a higher value in advance as a pitch of the second musical sound is smaller that of the first musical sound and the difference in interval is smaller.

12. The information processing device according to claim 1, wherein the processes further comprise:

determining whether the second musical sound is a single sound, and determining to generate the second musical sound with the normal playing style in response to the second musical sound not being a single sound.

13. The information processing device according to claim 1, wherein the determining comprises determining to generate the second musical sound with the normal playing style, in response to determining that a value of the first occurrence probability or the second occurrence probability is zero.

14. A method executed under control of a computer operably coupled to a keyboard and a key scanner configured to monitor keys of the keyboard to detect a key-press operation and a key-release operation thereof, the method comprising:

acquiring first information corresponding to a first musical sound that is a musical sound of an instrument other than a keyboard instrument and second information corresponding to a second musical sound that is a musical sound of the instrument other than the keyboard instrument and that is generated after the first musical sound;

acquiring a first occurrence probability, which is an occurrence probability of a special playing style with respect to an elapsed time since an end of a predetermined operation, the predetermined operation being a key-release operation detected by the key scanner after the first musical sound is generated in response to detection of a key-press operation by the key scanner, and a second occurrence probability, which is an occurrence probability of the special playing style with respect to an elapsed time after the first musical sound is generated until the second musical sound is generated, according to the first information and the second information;

determining whether to generate the second musical sound with one of a normal playing style or the special playing style, according to the first occurrence probability and the second occurrence probability; and outputting the second musical sound generated with the determined one of the normal playing style or the special playing style.

15. A non-transitory computer-readable recording medium having a program recorded thereon, the program being executable by a computer, which is operably coupled to a keyboard and a key scanner configured to monitor keys of the keyboard to detect a key-press operation and a key-release operation thereof, to control the computer to execute processing comprising:

acquiring first information corresponding to a first musical sound that is a musical sound of an instrument other than a keyboard instrument and second information corresponding to a second musical sound that is a musical sound of the instrument other than the keyboard instrument and that is generated after the first musical sound;

acquiring a first occurrence probability, which is an occurrence probability of a special playing style with respect to an elapsed time since an end of a predetermined operation, the predetermined operation being a key-release operation detected by the key scanner after the first musical sound is generated in response to detection of a key-press operation by the key scanner, and a second occurrence probability, which is an occurrence probability of the special playing style with respect to an elapsed time after the first musical sound is generated until the second musical sound is generated, according to the first information and the second information;

determining whether to generate the second musical sound with one of a normal playing style or the special playing style, according to the first occurrence probability and the second occurrence probability; and outputting the second musical sound generated with the determined one of the normal playing style or the special playing style.

* * * * *